United States Patent [19]

Zuccatti

[11] 4,047,809

[45] Sept. 13, 1977

[54] SPECTACLES HAVING ADJUSTABLE TEMPLES

[76] Inventor: Joyce L. Zuccatti, 9411 Lee Highway 713, Fairfax, Va. 22030

[21] Appl. No.: 689,566

[22] Filed: May 24, 1976

[51] Int. Cl.² .............................................. G02C 5/20
[52] U.S. Cl. .................................... 351/118; 351/119
[58] Field of Search .......................... 351/118, 119, 19; 403/108, 109

[56] References Cited

U.S. PATENT DOCUMENTS

| 3,584,938 | 6/1971 | Lindblom | 351/118 |
| 3,649,107 | 3/1972 | Hoffmaster et al. | 351/118 |

*Primary Examiner*—Paul A. Sacher

[57] ABSTRACT

Spectacles that include a frame with temples each pivotally connected to the frame and in which the length of the temples are adjustable by the wearer. Extension means is cooperatively associated with each free end or terminal portion of the temples in the form of a pair of extension members. Guiding means is utilized to permit slidable movement of the extension members relative to the temple during adjustment to its various positions with locking means for releasably securing the extension members in longitudinally adjusted positions relative to their companion temple.

3 Claims, 3 Drawing Figures

SPECTACLES HAVING ADJUSTABLE TEMPLES

BACKGROUND OF THE INVENTION

This invention relates to spectacles to permit the user to adjust the length of the temples to maintain the frame securely on the head of the user.

The inventor has found that eye glasses loosen on the nose because the temples tend to loosen over the ears. Consequently the frames easily slip down on the nose of the wearer and become extremely uncomfortable and awkward to maintain in position. Accordingly to overcome the problem faced by millions of wearer's of glasses the inventor has invented a novel manner in constructing spectacles in which the length of the temples are adjustable by the user.

OBJECTS OF THE INVENTION

The present invention has as its principle object spectacles with simple inexpensive adjustable temples as to the length thereof.

Another object of the invention is to provide an eyeglass frame with temple members which may be adjusted for varying the length between the temple free end and hinged ends of the temple.

Another object of the invention is to provide spectacles with the temples that adjust the position of the curved end for exerting pressure on the back of the ears of the wearer's head and providing a comfortable fit.

Another object of the invention is to provide spectacles with members which can initially be pre-set for the position of the temples and allowing a wearer to take off and change the length of the temples to return to a comfortable fitting wearing position after prolonged use.

Other and further features, objects and advantages of the invention will become apparent from the detailed description to follow.

SUMMARY OF THE INVENTION

The present invention pertains to improved adjustable spectacles having a conventional frame with temples each of which has one end pivotally connected to the spectacles and a free end or terminal portions with extension means cooperatively associated with each free end of the temples. The extension means comprising a pair of extension members with guiding means to permit slidable movement of the members relative to its temple during adjustment to various positions. The guiding means comprising an extension member for a respective temple that are interfitted one within the other and being slidable and longitudinally adjustable relatively to its respective temple.

Locking means is provided for releasably securing the extension members in longitudinally adjusted positions relative to their companion temple, with the locking means including a locking member for bridging between and interconnecting the extension member and temple. The locking means includes a plurality of apertures in spaced apart relation to each other positioned on each temple with means for securing one end of the locking member to an extension member and the other end of the locking member adapted to fit within a respective aperture to maintain the extension member in adjustably fixed position to the temple when worn by the user.

BRIEF DESCRIPTION OF THE DRAWINGS

Although the characteristic features of the invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DESCRIPTION OF THE PREFERRED EMBODIMENT

Figure 1:
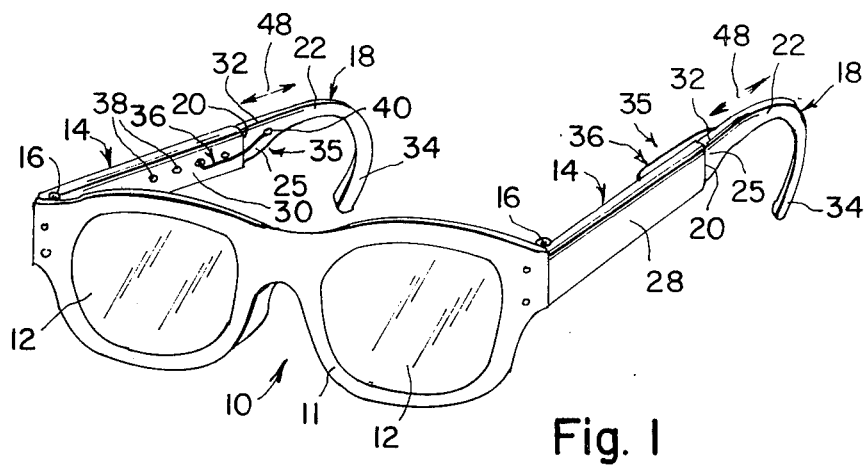
FIG. 1 is a perspective view showing spectacles having adjustable temples of the present invention.

Referring now to the drawings, and particularly as shown in FIG. 1, 10 generally designates the usual spectacles or eyeglass frame, including a frame 11 carrying lenses 12 and provided with temples or bows 14 which have their forward ends hinged to the frame by hinges 16. The temples 14 normally are positioned along the side of the head of the wearer (not shown) and hold the spectacles 10 in position.

According to the present invention, extension means 18 is provided at the free end 20 of the temples enabling the temples 14 to be readily adjusted to hold the spectacles 10 in position.

Figure 2:
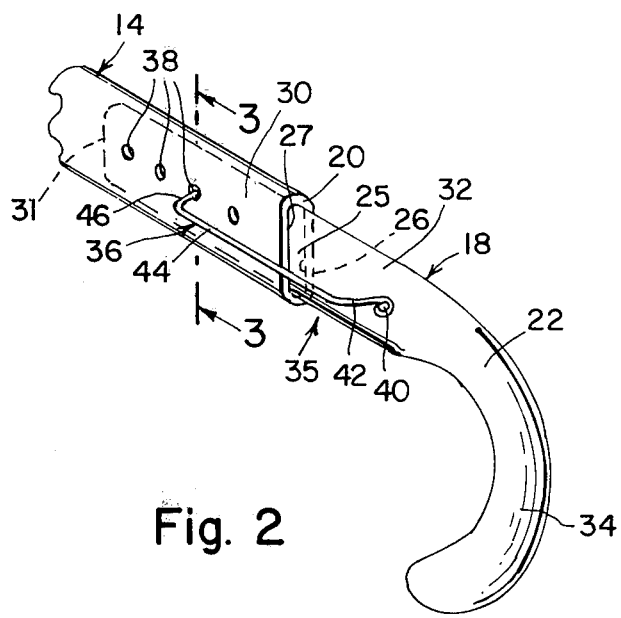
FIG. 2 is an enlarged fragmentary view in perspective further illustrating the invention.
Figure 3:
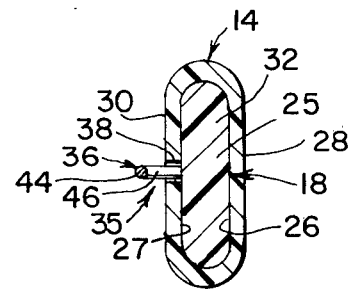
FIG. 3 is an enlarged section view taken along line 3—3 of FIG. 2.

As shown in FIGS. 2 and 3, the free end or terminal portion 20 of the temple 14 has the extension means 18 cooperatively associated therewith. The extension means 18 comprising a pair of extension members 22, with guiding means 25 to permit slidable movement of the extension members 22 relative to its temple 14 during adjustment to its various positions. The guiding means 25 comprising each extension member 22 and a respective temple 14 that are interfitted one within the other and being slidable and longitudinally adjustable relatively to its respective temple 14. As seen the temple portion 20 is tubular having spaced-apart inner walls 26 and 27 with an outwardly extending visible temple wall 28 and an inwardly extending temple wall 30. The extension member 22 has a front end 31 with a body portion 32 adapted to snugly fit within the hollow tubular temple 14 and an integrally formed curved rear end hook portion 34 that fits behind the ear of the wearer. In this manner the guiding means 25 is constituted by channel members with the extension member 22 retractable inwardly and outwardly of and interfitting with the companion temple 14. If desired the extension member could be hollow and the temple member contained therein in similar fashion as disclosed above.

Locking means 35 is provided for releasably securing the extension members 22 in longitudinally adjusted positions relative to their companion temple 14 with the locking means 35 including a locking member 36 for bridging between and interconnecting the extension member 22 and temple 14. The locking means 35 includes a plurality of apertures 38 in spaced apart relation to each other positioned on each temple 14 on the inner wall 30 that may extend in a common plane. Retaining means in the form of a fastener 40 secures one end of the locking member 36 to an extension member 22 and the other end of the locking member 36 adapted to fit within a respective aperture 38 to maintain the extension member 22 in adjustably fixed position to the temple 14. The fastener 40 may be in the form of a rivet or eyelet. The respective sections of the spectacles 10 made of a plastic material except for the locking member which is of a fine metallic wire although a plastic material is also possible.

Each locking member 36 includes an inwardly extending arm 42 at one end thereof secured to the extension member 22 by the fastener 40 and a flexible resilient body portion 44 integrally formed with and extending parallel to the extension member 22 and terminating in an inwardly extending projection or tab 46 integrally formed with the body portion 44 and adapted to extend in the respective apertures 38 of the temple 14. In this manner a positive force is applied to disengage and retract the ear 46 from witnn the respective aperture 38 to overcome the tension against the temple 14 to permit longitudinal adjustment of the extension member 22 in the direction of double headed arrow 48 until the adjustment is made and in the normal wearing position of the spectacles 10 by the wearer sufficient pressure is maintained to retain the tab 46 in place. The locking members 36 are positioned inwardly of each temple 14 so that they are not visible when the spectacles 10 are worn.

From the foregoing it will be seen that there is provided a very simple and effective means for adjusting the length of the temples into a comfortable holding position with the head by merely adjusting the extension means with respect to the temple and thus eliminating the necessity of bending or otherwise deforming the temple member.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

I claim:
1. Spectacles comprising:
A. a frame;
B. temples each of which has one end pivotally connected to said frame and an oppositely disposed free end with an inwardly extending temple wall extending intermediate said ends;
C. extension means cooperatively associated with each free end of said temples, said extension means comprising a pair of extension members;
D. guiding means to permit slidable movement of said extension members relative to its temple during adjustment to its various positions, said guiding means providing each extension member and a respective temple to be interfitted one within the other and being slidable and longitudinally adjustable relative to its temple;
E. said guiding means is constituted by a channel in said temples, and said extension member is retractable inwardly and outwardly of and interfitting with the companion channel in the temple;
F. locking means for releasably securing said extension members in longitudinally adjusted positions relative to their companion temple, said locking means include a locking member for bridging between and interconnecting the extension member and temple;
G. said locking means includes a plurality of apertures in spaced apart relation to each other positioned on said inwardly extending temple wall; and
H. said locking member includes:
 1. an inwardly extending arm at one end thereof,
 2. means for firmly securing to the extension member said arm,
 3. a flexible body portion integrally formed with said arm and extending parallel to said extension member,
 4. an inwardly projecting tab integrally formed with said body portion and adapted to extend in the respective apertures of the temple, so that a positive force is required to disengage and retract said tab from within the respective aperture to overcome the tension against the temple to permit longitudinal adjustment of the extension member, such that in the normal wearing position of the spectacles by the wearer sufficient pressure is maintained to retain said tab within its aperture,
 5. said locking members being positioned inwardly of each temple so that they are not visible when the spectacles are worn, and
 6. said tab being dimensioned so as to retain said body portion in laterally spaced apart relationship to said inwardly extending temple wall so as to facilitate grasping said body portion to release said tab from a particular one of said apertures such that longitudinal adjustment of said extension member relative to a respective one of said temples may be obtained.

2. Spectacles as defined in claim 1, wherein said temples are tubular to receive therein the extension member, and each of said extension members is independently extensible longitudinally relative to its respective temple.

3. Spectacles as defined in claim 1, wherein the rear portion of the extension members are curved to fit behind the ears of the wearer.

* * * * *